US011266910B2

(12) United States Patent
Wang (10) Patent No.: US 11,266,910 B2
(45) Date of Patent: Mar. 8, 2022

(54) CONTROL METHOD AND CONTROL DEVICE

(71) Applicant: Lenovo (Beijing) Co., Ltd., Beijing (CN)

(72) Inventor: Liangyu Wang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/728,752

(22) Filed: Dec. 27, 2019

(65) Prior Publication Data

US 2020/0206632 A1 Jul. 2, 2020

(30) Foreign Application Priority Data

Dec. 29, 2018 (CN) .......................... 201811640534.5

(51) Int. Cl.
*A63F 13/67* (2014.01)
*G06F 3/01* (2006.01)
*A63F 13/58* (2014.01)

(52) U.S. Cl.
CPC .............. *A63F 13/67* (2014.09); *A63F 13/58* (2014.09); *G06F 3/011* (2013.01); *G06F 2203/011* (2013.01)

(58) Field of Classification Search
CPC .... G06F 3/011; G06F 2203/011; A63F 13/58; A63F 13/67
See application file for complete search history.

(56) References Cited

U.S. PATENT DOCUMENTS

| | | | | |
|---|---|---|---|---|
| 5,462,504 A | * | 10/1995 | Trulaske | A61B 5/0002 482/54 |
| 6,705,972 B1 | * | 3/2004 | Takano | A63B 71/0622 482/8 |
| 6,902,513 B1 | * | 6/2005 | McClure | A63B 24/0006 482/4 |

(Continued)

FOREIGN PATENT DOCUMENTS

CN 105413170 A 3/2016
CN 107437018 A 12/2017

(Continued)

*Primary Examiner* — Steve Rowland
(74) *Attorney, Agent, or Firm* — Anova Law Group, PLLC (57) ABSTRACT

A control method includes obtaining information of an external environment and operating information of a target application and switching the controlled object from a first operating state to a second operating state based on a correspondence among the external environment information, the operating information of the target application and an operating state. The target application is an application configured to respond to information of an external operation to cause an object controlled by the target application to generate a corresponding response. The correspondence indicates the operating state of the object under different information of the external environment information and different operating information of the target application. An application parameter of the target application corresponding to the controlled object being in the first operating state is different from an application parameter of the target application corresponding to the controlled object being in the second operating state.

17 Claims, 5 Drawing Sheets

(56) References Cited

U.S. PATENT DOCUMENTS

| | | | | |
|---|---|---|---|---|
| 7,070,539 | B2* | 7/2006 | Brown | G06F 13/4027 |
| | | | | 482/8 |
| 2002/0082065 | A1* | 6/2002 | Fogel | A63F 13/58 |
| | | | | 463/8 |
| 2002/0082077 | A1* | 6/2002 | Johnson | A63F 13/58 |
| | | | | 463/30 |
| 2006/0025282 | A1* | 2/2006 | Redmann | A61B 5/1112 |
| | | | | 482/8 |
| 2007/0167204 | A1* | 7/2007 | Lyle | A63F 13/12 |
| | | | | 463/9 |
| 2007/0239479 | A1* | 10/2007 | Arrasvuori | G06Q 10/10 |
| | | | | 705/2 |
| 2014/0004948 | A1* | 1/2014 | Watkins, Jr. | A63F 13/10 |
| | | | | 463/36 |
| 2017/0206694 | A1* | 7/2017 | Jiao | G06T 7/246 |
| 2017/0357417 | A1* | 12/2017 | Goossens | G06F 3/04845 |
| 2018/0350144 | A1* | 12/2018 | Rathod | G06Q 20/3276 |
| 2019/0001223 | A1* | 1/2019 | Blackstock | A63F 13/79 |
| 2019/0094981 | A1* | 3/2019 | Bradski | G06F 3/011 |
| 2019/0204907 | A1* | 7/2019 | Xie | A63F 13/424 |
| 2019/0270018 | A1* | 9/2019 | Evans | G06F 3/048 |
| 2020/0019242 | A1* | 1/2020 | Atlas | G06N 20/00 |
| 2020/0342648 | A1* | 10/2020 | Shimizu | G06F 3/0481 |

FOREIGN PATENT DOCUMENTS

| | | |
|---|---|---|
| CN | 107735747 A | 2/2018 |
| CN | 108499111 A | 9/2018 |
| CN | 108939553 A | 12/2018 |
| JP | 2010227454 A | 10/2010 |

* cited by examiner

CONTROL METHOD AND CONTROL DEVICE

CROSS-REFERENCE TO RELATED APPLICATION

This application claims the priority to Chinese Patent Application No. 201811640534.5, entitled "A Control Method and Control Device" and filed on Dec. 29, 2018, the entire content of which is incorporated herein by reference.

TECHNICAL FIELD

The present disclosure relates to the field of computer data processing, and in particular relates to a control method and a control device.

BACKGROUND

Many applications that can interact with users, such as games, are installed on electronic devices. The operating state of the controlled object in these applications usually changes based on the information or rules of the controlled object, and oftentimes cannot match with the user and the user's environment which leads to a low sense of realistic experience brought by the applications.

SUMMARY

According to one aspect of the present disclosure, a control method is provided. The control method includes obtaining information of an external environment and operating information of a target application and switching the controlled object from a first operating state to a second operating state based on a correspondence among the external environment information, the operating information of the target application and an operating state. The target application is an application configured to respond to information of an external operation to cause an object controlled by the target application to generate a corresponding response. The information of the external environment is different from the information of the external operation. The correspondence indicates the operating state of the object under different information of the external environment information and different operating information of the target application. An application parameter of the target application corresponding to the controlled object being in the first operating state is different from an application parameter of the target application corresponding to the controlled object being in the second operating state.

According to another aspect of the present disclosure, a control device is provided. The control device includes a first acquisition module configured to obtain information of an external environment and operating information of a target application and a first control module configured to switch the controlled object from a first operating state to a second operating based on a correspondence among the information of the external environment, the operating information of the target application and the operating state. The target application is an application configured to respond to information of an external operation to cause a controlled object to generate a corresponding response. The information of the external environment is different from the information of the external operation. The correspondence indicates an operating state of the controlled object under different information of the external environment and different operating information of the target application. An application parameter of the target application in response to the controlled object being in the first operating state is different from an application parameter of the target application in response to the controlled object being in the second operating state.

According to further aspect of the present disclosure, a non-transitory computer-readable storage medium for storing programs is provided. When executed, the stored programs can cause one or more processors to perform a control method, including obtaining information of an external environment and operating information of a target application and switching the controlled object from a first operating state to a second operating state based on a correspondence among the external environment information, the operating information of the target application and an operating state. The target application is an application configured to respond to information of an external operation to cause an object controlled by the target application to generate a corresponding response. The information of the external environment is different from the information of the external operation. The correspondence indicates the operating state of the object under different information of the external environment information and different operating information of the target application. An application parameter of the target application corresponding to the controlled object being in the first operating state is different from an application parameter of the target application corresponding to the controlled object being in the second operating state.

BRIEF DESCRIPTION OF THE DRAWINGS

In the drawings (not necessarily drawn to scale), similar reference numerals may describe similar components in different diagrams. Similar reference numerals with different letter suffixes may represent different examples of similar components. The drawings generally illustrate various embodiments discussed herein by way of example but not limitation.

DETAILED DESCRIPTION OF THE EMBODIMENTS

It should be understood that the specific embodiments described herein are only used to explain the present disclosure, but not to limit the present disclosure.

In the following description, the use of suffixes such as "module", "component", or "unit" for indicating elements is merely for the benefit of the description of the present disclosure, and they do not have specific meanings by themselves. Therefore, "modules," "components," or "units" can be used in combination.

The terminal can be implemented in various forms. For example, the terminals described in this disclosure may include mobile terminals such as a mobile phone, a laptop computer, and fixed terminals such as a digital TV, a desktop computer, etc.

In the subsequent description, a mobile terminal is taken as an example for explanation. Those skilled in the art should understand that, in addition to the elements specifically used for mobile purposes, the configuration in the embodiments of the present disclosure can also be applied to a fixed terminal.

Here, a game application is taken as an example to describe an application including a controlled object, where the controlled object is a game character in the game application. During an operating of the game, an attribute state of the game character is set by the designer in advance, and has nothing to do with an emotional state or external environment of a player who controls the game. For example, when a user is playing a game, his emotion is high, but at this time, the game character may be in a lowest combat effectiveness. Even if the user wants to fight a battle, he has no options but to end the game. Accordingly, the attribute state of the game character cannot match the emotional state of the user, so that it cannot bring a realistic game experience to the player.

Figure 1A:
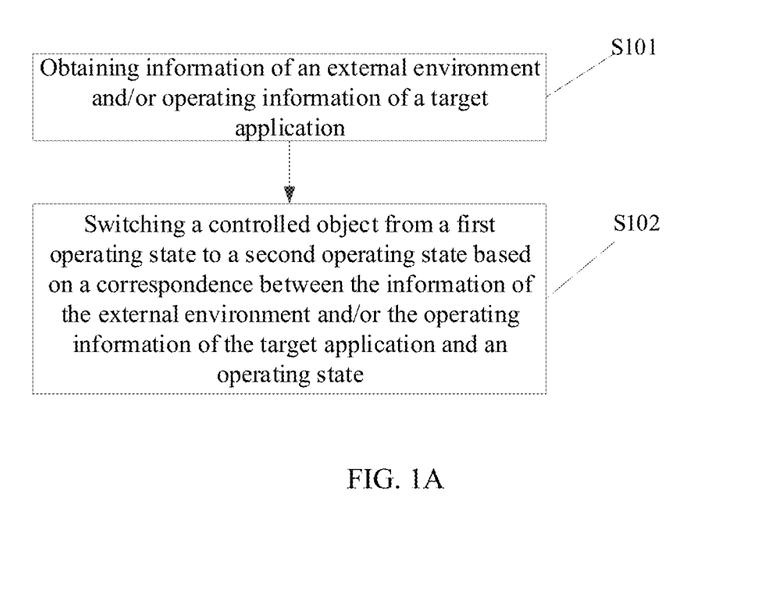
FIG. 1A illustrates a flowchart of an implementation of a first control method according to some embodiment of the present disclosure.

Based on this, some embodiment of the present disclosure provides a control method. FIG. 1A illustrates a flowchart of an implementation of a control method according to some embodiment of the present disclosure. As shown in FIG. 1A, the method includes the following steps.

S101: Obtaining information of an external environment and/or operating information of a target application.

The target application is an application capable of responding to information of an external operation so that the controlled object can have a corresponding response. Also, in this embodiment, the information of the external environment is different from the information of the external operation. That is, the information of the external environment can be interpreted as, external environment (e.g., the light intensity and temperature in the external environment), the user's natural attributes, and the user's behavior characteristics collected by the camera in the device; whereas the information of the external operation can be interpreted as user inputted instructions when operating the target application. For example, if the target application is a game application, the controlled object is a game character in the game application, and an instruction for a dodge of the game character in the game application is controlled by the external operation.

The operating information of the target application can be interpreted as an operating time of the target application (e.g., a moment of starting operating a game application), an operating duration (a time of operating the game), an interacting moment (a moment when interacting with the controlled object in the game), an interacting duration (time spent in interacting with controlled objects in the game), etc.

S102: Controlling a controlled object from a first operating state to a second operating state based on a correspondence between the information of the external environment and/or the operating information of the target application and an operating state.

Here, the correspondence indicates an operating state of the controlled object under different information of the external environment and/or different operating information of the target application. When the controlled object is in the first operating state and the second operating state, respectively, application parameters of the target application are different. For example, the target application is a game application, and the controlled object in the game application is a game character, and an ability value in the first operating state is different from an ability value of the game character in the second operating state.

The application parameter includes a control parameter of the controlled object and/or an attribute parameter of the controlled object. The control parameter of the controlled object can be interpreted as a correspondence parameter of the information of the external operation and a correspondence parameter of response information of the controlled object, which are used to reflect an increase or decrease of a difficulty level to control the controlled object. For example, in the middle of the night, in order to force the player to take a break, the difficulty level of control may be increased, thereby reducing the game experience. The attribute parameter of the controlled object can be interpreted as a parameter of the controlled object itself. For example, the controlled object is a game character, and the attribute parameter of the controlled object is the ability of the game character itself. In the middle of the night, in order to force the game player to rest, the ability value of the game character may be reduced, or an attack power of the game character may be reduced, etc., thereby forcing the player to end the game.

If the target application is a game application, S102 can be interpreted as changing the operating state of the game character in the game application according to the information of the external environment of the game application and the operating information of the game application. For example, the information of the external environment indicates that it is sunny outside, and the operating time in the operating information indicates that the game has run for ten minutes, and the game interacting moment is nine o'clock, indicating that the player has just started playing the game and is energetic. Then, in order to improve the game experience, the difficulty level of controlling the game character may be reduced (that is, the control parameter of the controlled object is reduced), and the ability value of the game character may be increased (that is, the value of the attribute parameter of the controlled object is increased), so that the operating state of the game character matches a state of the player, which provides the player with more realistic experience.

In this embodiment, the operating state of the controlled object in the target application is adjusted by obtaining the information of the external environment of the target application under operating and the operating information of the target application, so that the operating state of the controlled object in the target application can be matched with the information of the external environmental information and/or the operating information of the target application, thereby making the target application that better fits life which provides the user with more realistic experience.

Figure 1B:
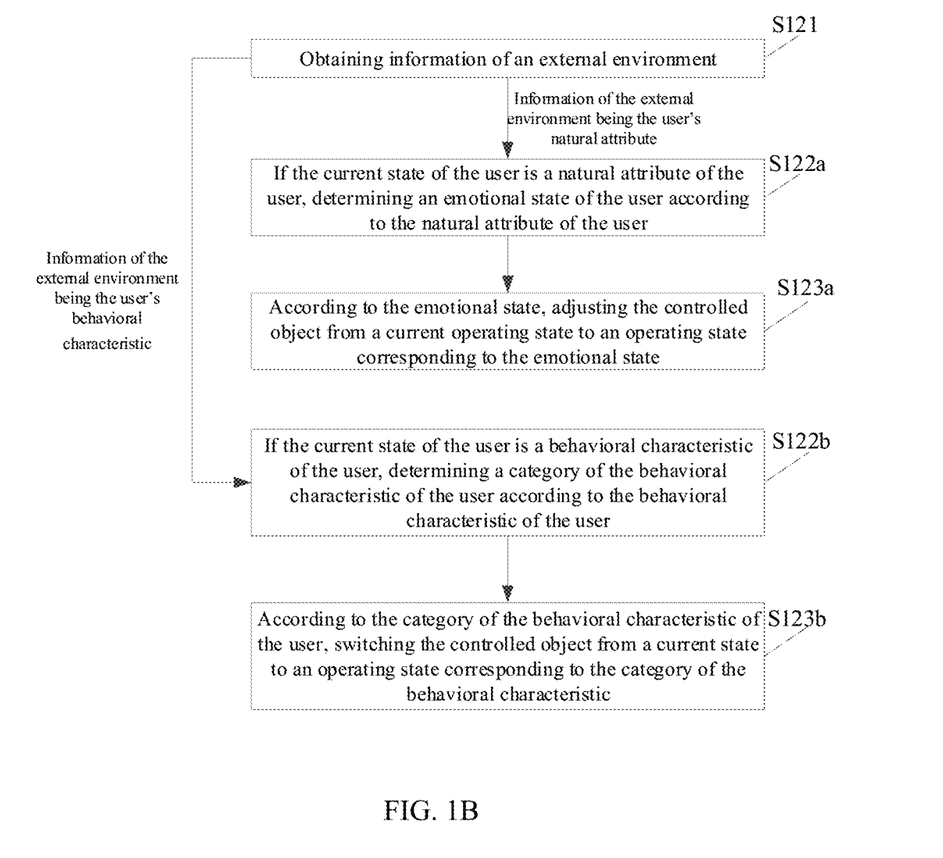
FIG. 1B illustrates a flowchart of an implementation of a second control method according to some embodiment of the present disclosure.

Some embodiment of the present disclosure provides a control method for adjusting an operating state of a controlled object based on the obtained external environment information. FIG. 1B illustrates a flowchart of an implementation of another control method according to some embodiment of the present disclosure. As shown in FIG, the method includes the following step.

S121: Obtaining information of an external environment.

Here, the information of the external environment is the information collected by the terminal corresponding to the target application by a sensor. The information of the external environment is at least related to one of: a natural environment where the terminal corresponding to the target application is located, or a current state of the user corresponding to the target application. That is, the information of the external environment is usually information such as a temperature of the external environment, an intensity of light, a natural attribute of a person, and a behavioral characteristic of a person collected by sensors such as a camera, a microphone, and a thermometer. When the information of the external environment is the information related to the current state of the user corresponding to the target application, the information of the external environment may be a natural attribute of the user, or a behavioral characteristic of the user.

If the information of the external environment is a natural attribute of the user, it corresponds to the steps in case 1 below; and if the information of the external environment is a behavioral characteristic of the user, it corresponds to the steps in case 2 below.

First, if the external environment information is the current state of the user, adjusting the operating state of the controlled object based on the current state of the user includes the following two cases.

Case 1: If the current state of the user is the user's natural attribute, adjusting the operating state of the controlled object based on the user's natural attribute includes S122a and S123a.

S122a: If the current state of the user is a natural attribute of the user, determining an emotional state of the user according to the natural attribute of the user.

Here, the natural attributes of the user may be biological information, appearance information, and facial image information of the user. For example, the user's facial image information indicates that when the user's face is relaxed, and the mouth corners of the user are lifted, the user is in a happy mood; or based on the biological information, it is determined that the user's pulse rate is accelerated, then it is indicated that the user's mood is high at this time.

S123a: According to the emotional state, adjusting the controlled object from a current operating state to an operating state corresponding to the emotional state.

Figure 1C:
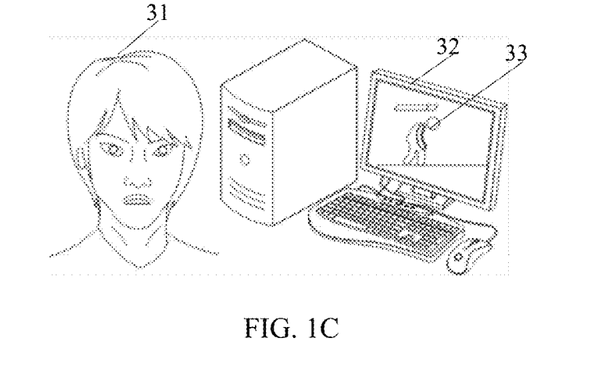
FIG. 1C is a first interface diagram of a control method according to some embodiment of the present disclosure.

Here, if the user's emotional state shows a good mood, a value of the attribute parameter of the controlled object may be increased, so that the ability of the controlled object itself is improved. If the user's emotional state shows a low mood, the attribute parameter of the controlled object may be decreased, to cause the ability of the controlled object to be reduced, so that the ability value of the controlled object matches the user's emotional state. If the target application is a game application, as shown in FIG. 1C, a player 31 controls a game application on a terminal 32. From a facial expression of the player 31, it can be seen that the current emotional state of the player 31 is an angry state. At this time, the value of the attribute parameter of the game character in the game may be increased (e.g., increase the attack power, reduce the dodging ability of the game character), and the value of the control parameter of the game character 33 may be decreased (that is, to reduce the difficulty level of controlling the game character 33), so that the operating state of the game character can be matched with the player's emotional state.

In the above steps S122a and S123a, a method to implement "if the current state of the user is the user's natural attribute, adjust the operating state of the controlled object based on the user's natural attribute" is provided. The user's emotional state is determined based on the user's natural attribute. When the user's emotional state shows a good mood, the value corresponding to the attribute parameter of the controlled object may be increased (that is, the ability value of the controlled object itself is increased), or the value of the control parameter of the controlled object may be decreased (that is, reduce the difficulty level of controlling the controlled object). When the user's mood is low, the value corresponding to the attribute parameter of the controlled object may be decreased, or the value of the controlled parameter of the controlled object may be increased, so as to provide the user with an realistic experience that better fits the user.

Case 2: If the current state of the user is a behavioral characteristic of the user, adjusting the operating state of the controlled object based on the behavioral characteristic of the user includes S122b and S123b.

S122b: If the current state of the user is a behavioral characteristic of the user, determining a category of the behavioral characteristic of the user according to the behavioral characteristic of the user.

Here, the user's behavioral characteristic may be the user's voice, the user's actions, etc. The category of the behavioral characteristic may be positive behavior and negative behavior. For example, the user's cursing behavior is a negative behavior; the user's laughing or praising of teammates is a positive behavior; user's slamming of a table or frantic behavior is a negative behavior.

Step S123b: According to the category of the behavioral characteristic of the user, switching the controlled object from a current state to an operating state corresponding to the category of the behavioral characteristic.

Here, if the behavioral characteristic of the user is positive, the value of the attribute parameters of the controlled object may be increased, so that the ability of the controlled object itself is improved. If the behavioral characteristic of the user is negative, the attribute parameter of the controlled object may be decreased, to reduce the ability of the controlled object itself, thereby matching the ability value of the controlled object with the category of the user's behavior characteristic. For example, if the user yells badly, then reducing the value of the attribute parameter of the controlled object or increasing the difficulty level of controlling the controlled object to reduce the controlled object's own ability or makes it difficult to control the controlled object, thereby reducing the user's experience and forcing the user to use civilized language.

In the above steps S122b and S123b, a method to implement "if the current state of the user is a behavioral characteristic of the user, adjust the operating state of the controlled object based on the behavior of the user" is provided. In this method, the category of the behavioral characteristic is determined based on the behavioral characteristic of the user. When the user's behavioral characteristic is positive, the ability of controlling the controlled object may be increased, and when the user's behavioral characteristic is negative, the ability of the controlled object may be decreased, thereby providing the user with a realistic experience that better fits the user.

Second, when the external environment information is the natural environment where the terminal corresponding to the target application is located, adjusting the operating state of the controlled object based on the behavioral characteristic of the user are as follows.

Step A: Determining the natural environment where the terminal corresponding to the target application is located.

Here, the natural environment may include external light intensity and temperature.

Step B: According to the natural environment, adjusting the controlled object from a current operating state to an operating state corresponding to the natural environment.

Figure 1D:
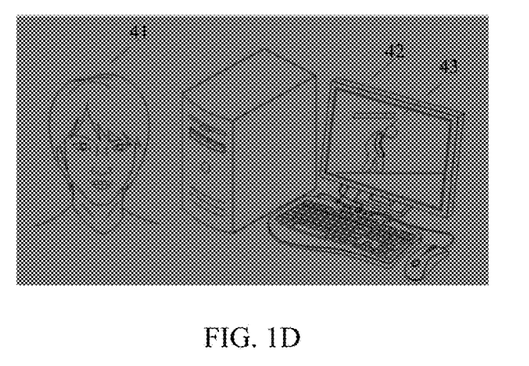
FIG. 1D is a second interface diagram of a control method according to some embodiment of the present disclosure.

Here, if the natural environment indicates that the current temperature is low, or the weather is cold, or it is time for a rest, then the value of the attribute parameter of the controlled object may be decreased or the value of the operating parameter of the controlled object may be increased to increase the difficulty level of controlling the controlled object. Or, if the natural environment indicates that the light intensity is low, it means that it is night and the current environment is dim, then the value of the attribute parameter of the controlled object may be decreased or the difficulty level of controlling the controlled object may be increased, to reduce the ability of the controlled object or makes it difficult to control the controlled object. If the target application is a game application, as shown in FIG. 1D, a player 41 controls the game application on a terminal 42. It can be seen from the natural environment of the terminal 42 that the light intensity is low; that is, the player 41 is playing the game in a dim environment. At this time, on the premise of protecting the player's 41 eyesight, the value of the attribute parameter of the game character in the game may be decreased (e.g., the attack power is weakened), and the value of the control parameter of the game character 43 may be increased (that is, the difficulty level of controlling the game character 43 is increased), forcing the player to end the game in a dark environment, or forcing the player to rest.

In this embodiment, the operating state of the controlled object is adjusted based on the information of the external environment, so that the operating state of the controlled object matches the current state of the user in the information of the external environment or the natural environment where the terminal is located, to provide the user with a realistic experience that better fits the user and promotes the user's physical health.

Figure 1E:
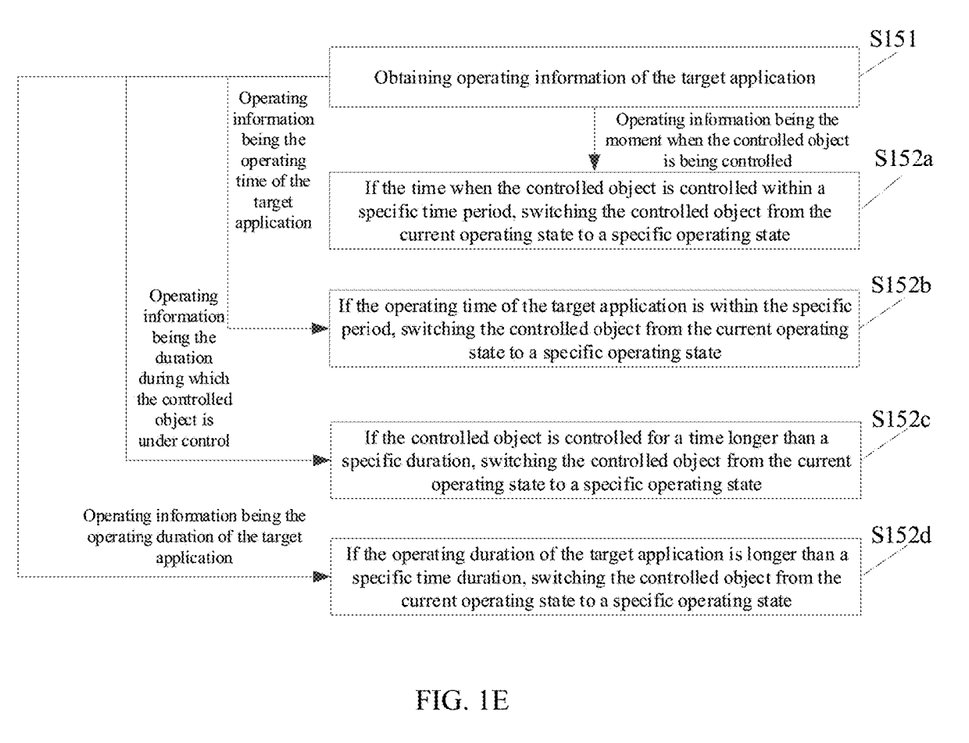
FIG. 1E illustrates a flowchart of an implementation of a third control method according to some embodiment of the present disclosure.

The embodiment of the present disclosure provides a control method for adjusting the operating state of the controlled object based on the obtained operating information of the target application. FIG. 1E illustrates a flowchart of an implementation of a third control method according to some embodiment of the present disclosure. As shown in FIG. 1E, the method includes the following steps.

Step S151: Obtaining operating information of the target application.

Here, the operating information of the target application is data information of the target application obtained by the terminal corresponding to the target application via a processor. The operating information of the target application is at least related to one of: the operating time of the target application, the operating duration of the target application, the moment when the controlled object is being controlled, and the duration for which the controlled object is under control. That is, the operating information of the target application is used to characterize the time-related information of the target application during the operating process, such as the operating time of the target application, the operating duration of the target application, the moment of interacting with the controlled object, and the duration of interacting with the controlled object, etc.

If the operating information of the target application is the moment when the controlled object is being controlled, it corresponds to the steps in Case 1 below; and if the operating information of the target application is the operating time of the target application, it corresponds to the steps in Case 2 below; if the operating information of the application is the duration for which the controlled object is under control, it corresponds to the steps in Case 3 below; and if the operating information of the target application is the operating duration of the target application, it corresponds to the steps in Case 4 below.

Adjusting the operating state of the controlled object based on the operating information of the target application includes the following cases.

Case 1: If the operating information is the moment when the controlled object is being controlled, based on the moment when the controlled object is being controlled, the steps of adjusting the operating state of the controlled object are as follows.

S152a: If the time when the controlled object is controlled within a specific time period, switching the controlled object from the current operating state to a specific operating state.

Figure 1F:
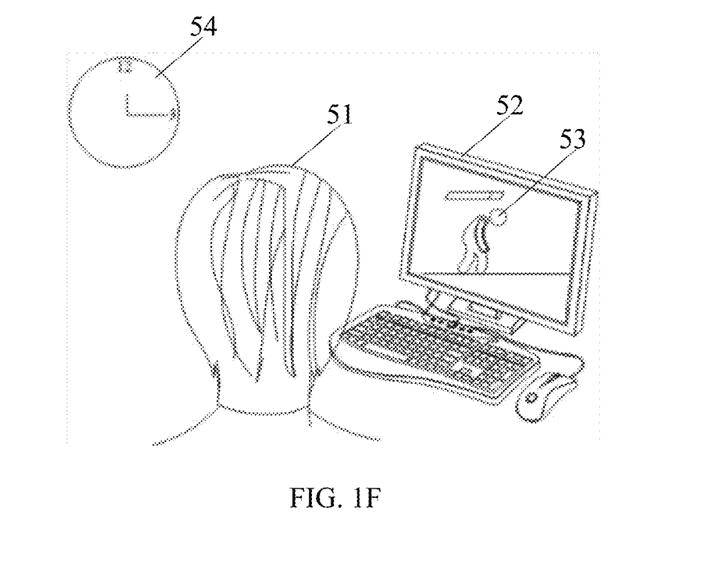
FIG. 1F is a third interface diagram of a control method according to some embodiment of the present disclosure.

Here, the controlled moment of the controlled object is the moment when the user interacts with the controlled object, which indicates that the user is controlling the controlled object at this moment. If the target application is a game application, then when the controlled moment of the controlled object indicates that at this moment, the user is playing the game. An application parameter corresponding to the specific operating state may be worse than an application parameter corresponding to the current operating state. That is, if the target application is a game application the moment when the controlled object is being controlled is within a specific time period, and the game character is controlled from the current operating state to a specific operating state with a lower ability value; that is, the ability value of the game character is reduced. For example, when the moment that the controlled object is controlled is one o'clock passing the midnight, it is indicated that the user is still playing the game at one o'clock in the morning, and in order to force the user to rest, the value of the attribute parameter of the controlled object may be decreased or the value of the operating parameter of the controlled object may be increased, in order to increase the difficulty level of controlling the controlled object or reduce the controlled object's own ability, so that the user has to end the game to rest. The step S132 can also be interpreted as that the specific time period is set from 10 am to 11 am, and if the moment when the controlled object is being controlled is within the specific time period, it means that the user is in an energetic state in the morning to play the game. At this time, the value of the attribute parameter of the game character may be increased (for example, the attack power may be increased or the dodging ability may be reduced, etc.), or the value of the operating parameter of the controlled object may be decreased (that is, the difficulty level of controlling the game character may be reduced), so as to increase the user's interest in the game. If the target application is a game application, as shown in FIG. 1F, a player 51 controls the game application on a terminal 52. If the obtained controlled object is controlled at a moment shown in clock 54, it is passing twelve o'clock at midnight, that is, the player 51 is still playing the game passing midnight. In order to force player 51 to end the game as soon as possible and go to rest, the value of the attribute parameter of the game character 54 in the game may be decreased (e.g., the attack power is weakened), and the value of control parameter of the game character 54 may be increased (e.g., the difficulty level of controlling the game character 54), thereby forcing the player to end the game and rest.

In the above step S152a, a method to implement "if the operating information of the target application is the moment when the controlled object is being controlled, adjust the operating state of the controlled object based on the moment when the controlled object is being controlled" is provided. In the method, whether the moment when the controlled object is being controlled is within a specific time period may be determined, and the controlled object's own ability may be improved if it is not within the specific time period, or the controlled object's own ability may be reduced if it is within the specific time period, which forces the user to end the game and go to rest, and is beneficial to the user's physical health.

Case 2: If the operating information is the operating time of the target application, adjusting the operating state of the controlled object based on the operating time of the target application includes S152b.

S152b: If the operating time of the target application is within the specific period, switching the controlled object from the current operating state to a specific operating state.

The operating time of the target application indicates that the target application is operating at this moment, and the user may interact with the controlled object or the user may not interact with the controlled object. For example, the target application is a game application. The operating time of the game application can be the moment when the user is playing the game; or, the user is not playing the game, and the game application is in a non-active state. In this embodiment, if the operating time of the target application is within a specific time period, the ability value of the controlled object may be reduced or the control difficulty level of controlling the controlled object may be increased, thereby forcing the user to end the game.

In other embodiments, based on the operating time of the target application, adjusting the operating state of the controlled object may also be: if the operating time of the target application is within a specific period, then determining whether the controlled object of the target application at the operating time is in an interactive state. If the controlled object is in an interactive state at this operating time (indicating that the user is controlling the target application at this time), then switching the controlled object from the current operating state to be a specific operating state (e.g., reducing the ability value of the game character, thereby forcing the user to end the game), if the operating time of the target application is within the certain period of time, but the controlled object of the target application is not in an interactive state at this operating time, then the operating state of the controlled object can remain unchanged. Accordingly, it is determined through multiple determining processes whether to adjust the operating state of the controlled object, so that the operating state of the controlled object fits better actual feelings of the user.

Case 3: If the operating information is the duration for which the controlled object is under control, based on the duration for which the controlled object is under control, adjusting the operating state of the controlled object includes S152c.

S152c: If the controlled object is controlled for a time longer than a specific duration, switching the controlled object from the current operating state to a specific operating state.

Here, an application parameter corresponding to the specific operating state is worse than an application parameter corresponding to the current operating state. The duration for which the controlled object is under control can be interpreted as a duration of an interaction between the user and the controlled object, and the specific duration can be set to three hours. If the interacting duration between the user and the controlled object is longer than three hours, then the ability value of the controlled object may be decreased to force the user to end the game and rest for a while.

Case 4: If the operating information is the operating duration of the target application, based on the operating duration of the target application, adjusting the operating state of the controlled object includes S152d.

S152d: If the operating duration of the target application is longer than a specific time duration, switching the controlled object from the current operating state to a specific operating state.

Here, the operating duration of the target application indicates that the target application is in an operating state during this time duration. The user may or may not interact with the controlled object. For example, the target application is a game application. The operating duration of the application may be the time duration in which the user plays the game, or it may be the time duration in which the user does not control the game and the game application is in a non-active state. In this embodiment, if the operating duration of the target application is longer than a specific time duration, then the ability value of the controlled object may be decreased or the difficulty level of controlling the controlled object may be increased, thereby forcing the user to end the game.

In other embodiments, based on the operating duration of the target application, adjusting the operating state of the controlled object may also be: if the operating duration of the target application is longer than a specific time duration, then determining whether the controlled object of the target application within this operating duration is in an interactive state. If the controlled object is in an interactive state during this operating duration (it is indicated that the user has been controlling the target application during this period of time), then change the controlled object from the current operating state to a specific operating state (e.g., reducing the ability value of a game character to force the user to end the game). If the target application's operating duration of longer than a specific time duration, but the controlled object of the target application is not in an interactive state within this operating duration (e.g., during this operating duration, the game is off), then not adjusting the operating state of the controlled object. As such, multiple determining processes are used to determine whether to adjust the operating state of the controlled object, so that the operating state of the controlled object fits better the user's actual feelings.

Figure 2:
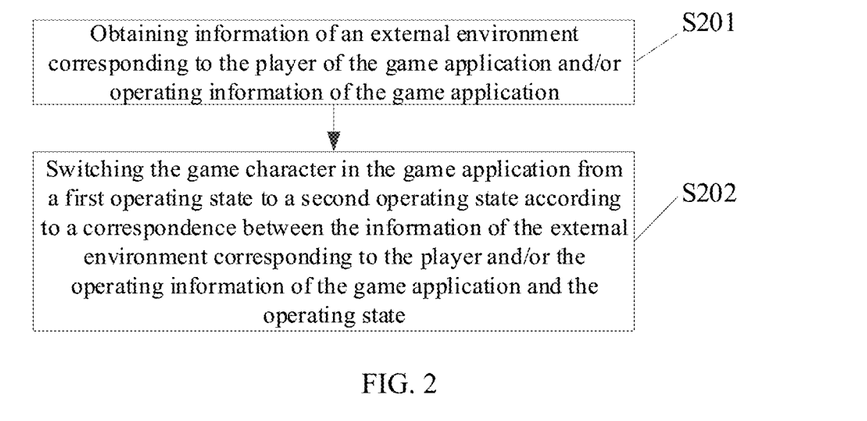
FIG. 2 illustrates a flowchart of an implementation of a fourth control method according to some embodiment of the present disclosure.

Some embodiment of the present disclosure provides a control method. FIG. 2 illustrates a flowchart of an implementation of another control method according to some embodiment of the present disclosure. As shown in FIG. 2, when the target application is a game application, the method includes the following steps.

S201: Obtaining information of an external environment corresponding to the player of the game application and/or operating information of the game application.

Here, the external environment information corresponding to the player may be a natural attribute of the player, a behavioral characteristic of the player, and a natural environment where the terminal corresponding to the game application is located. The operating information of the game application may be an operating duration of the game, an operating time, an interacting duration, an interaction time, etc.

S202: Controlling the game character in the game application from a first operating state to a second operating state according to a correspondence between the information of the external environment corresponding to the player and/or the operating information of the game application and the operating state.

Here, when the game character is in the first operating state and the second operating state, respectively, the ability values of the controlled object are different. The step S202 can be interpreted as: when the information of the external environment is the player's natural attribute, determining the player's emotional state based on the player's natural attribute; then, according to the emotional state, adjusting the controlled object from the current operating state to an operating state corresponding to the emotional state. The player's natural attributes include biological information, appearance information, and facial image information.

In this embodiment, adjusting the operating state of the game character based on the player's natural attribute includes the following cases.

Case 1: When the natural attribute is facial image information, adjusting the operating state of the game character is: if the emotional state of the player is being angry, the attack power of the game character may be enhanced. That is, if the emotional state of the player is being angry, the dodging ability of the game character may be reduced. The dodging ability of the character is used to indicate the ability of the character to evade an attack from other characters. If the emotional state is not being angry, the dodging ability of the character may be enhanced.

Case 2: When the natural attribute is biological information, adjusting the operating state of the game character is: determining a health state of the game player according to the biological information; if the health state is a poor health state, reducing the game character and if the health state is a good health state, enhancing the attack power of the character in the game and enhancing the character's dodging ability. For example, when the user's heartbeat is abnormal, the dodging ability of the game character may be reduced to force the user to end the game and rest.

Case 3: When the natural attribute is appearance information of the player, adjusting the operating state of the game character is: adjusting an armor type of the game character and an armor color of the character according to the appearance information, so that the armor type of the character and the armor color of the character match the appearance information of the game player. As such, the game character can closely fit the player which enhances the game experience.

Case 4: When the external environment information is a player's behavior characteristic, adjusting the operating state of the game character is: assuming that the behavioral characteristic is the player's voice information, and when the player's voice information meets a preset condition, enhancing the attack power of the game character and improving the dodging ability of the character. For example, when a decibel value of the player's voice information is low and less than a preset decibel threshold value, it is indicated that the player is not in a state of high emotion. Accordingly, the dodging ability of the game character may be increased.

In other embodiments, when a distance between the player and the game interface does not satisfy a preset distance threshold, the attack power of the game character may be reduced, and the dodging ability of the game character may be reduced. Alternatively, when the game operating duration is longer than a preset time threshold, the attack power of the game character may be reduced, and dodging ability of the game character may be reduced. Or, when detecting that a current environment brightness does not satisfy a preset environment brightness threshold, the attack power of the game character may be reduced, and the dodging ability of the game character may be reduced.

In this embodiment, based on the player's state when playing the game and the information of the external environment, the attack power and dodging ability of the game character may be enhanced or reduced, to make the game character more closely fit the player in real life, thereby providing the player with a more realistic game experience.

Some exemplary embodiment of the present disclosure provides a control device. The device includes each module included, and each unit included in each module which can be implemented by a processor of a terminal. Of course, it can also be implemented by a specific logic circuit. In the implementation process, the processor may be a central processing unit (CPU), a micro processing unit (MPU), a digital signal processor (DSP), or a field-programmable gate array (FPGA).

Figure 3:
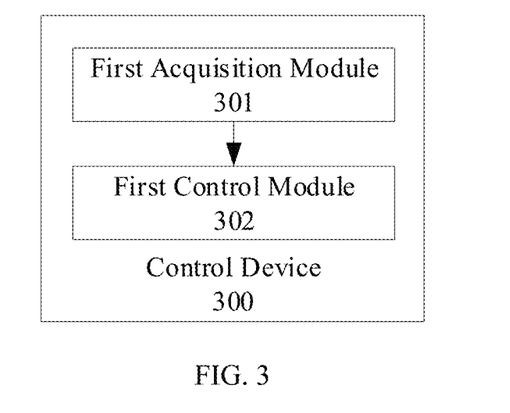
FIG. 3 is a schematic structural diagram of a control device according to some embodiment of the present disclosure.

FIG. 3 is a schematic structural diagram of a control device according to some embodiment of the present disclosure. As shown in FIG. 3, the device 300 includes a first acquisition module 301 and a first control module 302.

The first obtaining module 301 is configured to obtain information of an external environment and/or operating information of a target application. The target application is an application capable of responding to external operation information to cause a controlled object to generate a corresponding response. The information of the external environment information and the information of external operation are different.

The first control module 302 is configured to switch the controlled object from a first operating state to a second operating state according to a correspondence between the information of the external environment and/or the operating information of the target application and the operating state.

The correspondence indicates an operating state of the controlled object under different external environment information and/or different operating information of the target application.

When the controlled object is in the first operating state and the second operating state, respectively, application parameters of the target application are different.

In the above device, the application parameter includes a control parameter of the controlled object and/or an attribute parameter of the controlled object.

In the above device, the external environment information is information collected by a terminal corresponding to the target application by a sensor. The information of the external environment corresponds to at least related to one of: a natural environment where the terminal corresponding to the target application is located, and the current state of the user corresponding to the target application.

In the above device, the operating information of the target application is data information of the target application obtained by a terminal corresponding to the target application via a processor. The operating information of the target application is at least related to one of: an operating time of the target application, an operating duration of the target application, a moment when the controlled object is being controlled, and a time duration during which the controlled object is under control.

In the above device, if the current state of the user is a natural attribute of the user, the first control module 302 includes a first determining unit configured to determine an emotional state of the user based on the natural attribute of the user and a first control unit configured to adjust the controlled object to from a current operating state to an operating state corresponding to the emotional state based on the emotional state.

In the above device, if the current state of the user is a behavioral characteristic of the user, the first control module 302 includes a second determining unit configured to determine a category of the behavioral characteristic of the user based on the behavioral characteristic of the user and a second control unit is configured to switch the controlled object from a current operating state to an operating state corresponding to the category of the behavioral characteristic based on the category of the behavioral characteristic of the user.

In the above device, if the operating information of the target application is the moment when the controlled object is being controlled, the first control module 302 includes a third control unit configured to switch the controlled object from a current operating state to a specific operating state if the moment at which the controlled object is being controlled is within a specific period. An application parameter corresponding to the specific operating state is worse than the application parameter corresponding to the current operating state.

In the above device, if the operating information of the target application is the duration for which the controlled object is under control, the first control module 302 includes a fourth control unit configured to switch the controlled object from the current operating state to ae specific operating state if the controlled object is controlled for a time duration longer than a specific time duration. An application parameter corresponding to the specific operating state is worse than the application parameter corresponding to the current operating state.

In the above device, when the target application is a game application, the first acquisition module 301 is configured to obtain information of an external environment corresponding to a player of the game application and/or operating information of the game application.

The first control module 302 is configured to control a game character in the game application from a first operating state to a second operating state based on a correspondence between the information of the external environment corresponding to the player and/or the operating information of the game application and the operating state. When the game character is in the first operating state and the second operating state, respectively, the ability values of the controlled object are different.

It should be noted that, in the embodiment of the present disclosure, if the above-mentioned control method is implemented in the form of a software module and sold or used as an independent product, it may also be stored in a storage medium which is readable on a terminal. Based on such an understanding, the technical solutions of the embodiments of the present disclosure that are essential to or contribute to the existing technology can be embodied in the form of software products. The terminal software product is stored in a storage medium and includes several instructions for a terminal (which may be a personal computer or a server) to execute all or part of the methods described in the embodiments of the present disclosure.

Figure 4:
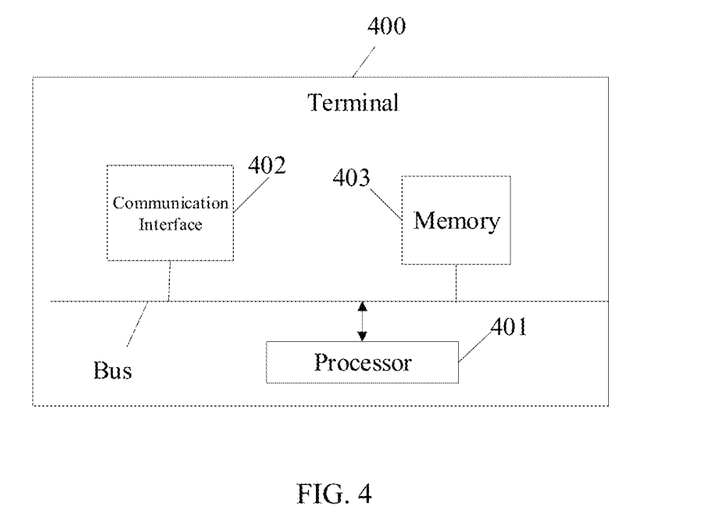
FIG. 4 is a schematic diagram of a hardware entity of a terminal according to some embodiment of the present disclosure.

It should be noted that FIG. 4 is a schematic diagram of a hardware entity of a terminal according to some embodiment of the present disclosure. As shown in FIG. 4, the hardware entity of the terminal 400 includes a processor 401, a communication interface 402, and a memory 403.

The processor 401 generally controls an overall operation of the terminal 400.

The communication interface 402 may enable a terminal to communicate with other terminals or servers via a network.

The memory 403 is configured to store instructions and applications executable by the processor 401, and may also cache data to be processed or processed by each module in the processor 401 and the terminal 400 (e.g., image data, audio data, voice communication data, and video communication data), which can be implemented by flash memory (FLASH) or random-access memory (RAM).

The above description of the storage medium and device embodiments is similar to the description of the above method embodiments, and has similar beneficial effects as the method embodiments. For technical details not disclosed in the storage medium and device embodiments of the present disclosure, reference may be made to the description of the method embodiments of the present disclosure for understanding.

In the several embodiments provided in this disclosure, it should be understood that the disclosed device and method may be implemented in other ways. The device embodiments described above are only exemplary. For example, the division of the units is only a logical function division. In actual implementation, there may be another division manner, for example, multiple units or components may be combined, or may be integrated into another system, or some features can be ignored or not implemented. In addition, the displayed or discussed components may be coupled, directly coupled, or connected to each other via some interfaces, coupling or connections of the devices or units, and may be electrical, mechanical, or other forms.

The above separate components may or may not be physically separated. The display components may or may not be physical units, and they may be located in one place or may be distributed on multiple network units. Some or all of the units need to be selected to achieve the objective of the solution of this embodiment.

In addition, the functional units in the embodiments of the present disclosure may be all integrated into one processing unit; or each unit may be separately used as a unit; or two or more units may be integrated into one unit. The above integrated units can be implemented in the form of hardware, or in the form of hardware plus software functional units.

A person of ordinary skill in the art may understand that all or part of the steps of the foregoing method embodiments may be implemented by a related hardware which is instructed by a program. The foregoing program may be stored in a readable storage medium. When the program is executed, the steps of the above method embodiments are performed. The foregoing storage medium includes various storage mediums that can store programs such as a mobile storage device, a read-only memory (ROM), a random-access memory (RAM), a magnetic disk, or an optical disk.

Alternatively, if the above-mentioned integrated unit of the present disclosure is implemented in the form of a software module and sold or used as an independent product, it may also be stored in a readable storage medium. Based on such an understanding, the technical solutions of the embodiments of the present disclosure that are essential to or contribute to the existing technology can be embodied in the form of a software product. A module may refer to computer programs stored in a storage medium and, when executed by one or more processors, the software module implements and executes all or part of the functions and methods described in relation to the module. A module may also be a combination of software and hardware components that implements and executes all or part of the functions and methods described in relation to the module. The foregoing storage medium include various types of mediums that can store program codes, such as a mobile storage device, a ROM, a RAM, a magnetic disk, or an optical disc.

The above is a detailed description of the embodiments of the present disclosure, but does not limit the protected scope of the present disclosure. Any variation or substitution made by a person skilled in the art within the technical scope disclosed in the present disclosure should be covered by the protected scope of the present disclosure. Therefore, the protected scope of the present disclosure shall conform to the protected scope of the addended claims.

What is claimed is:

1. A control method, comprising:
   obtaining information of an external environment and operating information of a target application, the target application being an application configured to respond to information of an external operation to cause an object controlled by the target application to generate a corresponding response, the information of the external environment, being different from the information of the external operation, is collected by a terminal corresponding to the target application via a sensor, the external environment information being at least related to one of: a natural environment, including temperature, intensity of light, time of the day, and location where the terminal corresponding to the target application is located, and a current state of a user corresponding to the target application, wherein the current state of the user includes an operating duration, an interacting moment, and an interacting duration; and
   switching the controlled object from a first operating state to a second operating state based on a correspondence among the external environment information, the operating information of the target application and an operating state, the correspondence indicating the operating state of the object under different information of the external environment information and different operating information of the target application, and an application parameter of the target application corresponding to the controlled object being in the first operating state being different from an application parameter of the target application corresponding to the controlled object being in the second operating state.

2. The method according to claim 1, wherein the application parameter comprises a control parameter of the controlled object and an attribute parameter of the controlled object.

3. The method according to claim 1, wherein the operating information of the target application is data information of the target application obtained by a terminal corresponding to the target application via a processor, the operating information of the target application being at least related to one of: an operating time of the target application, an operating time duration of the target application, the moment when the controlled object is being controlled, and the time duration during which the controlled object is controlled.

4. The method according to claim 1, wherein in response to the current state of the user being a natural attribute of the user, switching the controlled object from a first operating state to a second operating state based on the correspondence between the information of the external environment information and an operating state comprises:
   determining an emotional state of the user based on the natural attribute of the user; and
   adjusting the controlled object from a current operating state to an operating state corresponding to the emotional state based on the emotional state.

5. The method according to claim 1, wherein in response to the current state of the user being a behavioral characteristic of the user, switching the controlled object from a first operating state to a second operating state based on the correspondence between the information of the external environment information and an operating state comprises:
   determining a category of the behavioral characteristic of the user based on the behavioral characteristic of the user; and
   switching the controlled object from a current state to an operating state corresponding to the category of the behavioral characteristic based on the category of the behavioral characteristic of the user.

6. The method according to claim 3, wherein in response to the operating information of the target application being the moment when the controlled object is being controlled, switching the target application from a first operating state to a second operating state based on the correspondence between the operating information of the target application and an operating state comprises:
   in response to the moment when the controlled object is being controlled being within a specific time period, switching the controlled object from the current operating state to a specific operating state, an application parameter corresponding to the specific operating state being worse than an application parameter corresponding to the current operating state.

7. The method according to claim 3, where in response to the operating information of the target application being the time duration during which the controlled object is controlled, switching the target application from a first operating state to a second operating state based on the correspondence between the operating information of the target application and an operating state comprises:
   in response to the controlled object being controlled for longer than a specific time duration, switching the controlled object from the current operating state to a specific operating state, an application parameter corresponding to the specific operating state being worse than an application parameter corresponding to the current operating state.

8. The method according to claim 1, wherein:
   in response to the target application being a game application, obtaining the information of the external environment and operating information of the target application comprises:
      obtaining the information of the external environment corresponding to a player of the game application and the operating information of the game application; and
   switching the controlled object from a first operating state to a second operating state based on the correspondence among the information of the external environment information, the operating information of the target application and the operating state comprises:
      controlling a game character in the game application to be from a first operating state to a second operating state based on the correspondence among information of the external environment corresponding to the player, the operating information of the game application and the operating state, an ability value of the controlled object in response to the game character being in the first operating state being different from an ability value of the controlled object in response to the game character being in the second operating state.

9. A control device, comprising:
a first acquisition module configured to obtain information of an external environment and operating information of a target application, the target application being an application capable of responding to information of an external operation to cause a controlled object to generate a corresponding response, the information of the external environment, being different from the information of the external operation, is collected by a terminal corresponding to the target application via a sensor, the external environment information being at least related to one of: a natural environment, including temperature, intensity of light, time of the day, and location where the terminal corresponding to the target application is located, and a current state of a user corresponding to the target application, wherein the current state of the user includes an operating duration, an interacting moment, and an interacting duration; and
a first control module configured to switch the controlled object from a first operating state to a second operating state based on a correspondence among the information of the external environment, the operating information of the target application and the operating state, the correspondence indicating an operating state of the controlled object under different information of the external environment and different operating information of the target application, an application parameter of the target application in response to the controlled object being in the first operating state being different from an application parameter of the target application in response to the controlled object being in the second operating state.

10. The control device according to claim 9, wherein the application parameter comprises a control parameter of the controlled object and an attribute parameter of the controlled object.

11. The control device according to claim 9, wherein the operating information of the target application is data information of the target application obtained by a terminal corresponding to the target application via a processor, the operating information of the target application being at least related to one of: an operating time of the target application, an operating time duration of the target application, the moment when the controlled object is being controlled, and the time duration during which the controlled object is controlled.

12. The control device according to claim 9, wherein in response to the current state of the user being a natural attribute of the user, switching the controlled object from a first operating state to a second operating state based on the correspondence between the information of the external environment information and an operating state comprises:
determining an emotional state of the user based on the natural attribute of the user; and
adjusting the controlled object from a current operating state to an operating state corresponding to the emotional state based on the emotional state.

13. The control device according to claim 9, wherein in response to the current state of the user being a behavioral characteristic of the user, switching the controlled object from a first operating state to a second operating state based on the correspondence between the information of the external environment information and an operating state comprises:
determining a category of the behavioral characteristic of the user based on the behavioral characteristic of the user; and
switching the controlled object from a current state to an operating state corresponding to the category of the behavioral characteristic based on the category of the behavioral characteristic of the user.

14. The control device according to claim 11, wherein in response to the operating information of the target application being the moment when the controlled object is being controlled, switching the target application from a first operating state to a second operating state based on the correspondence between the operating information of the target application and an operating state comprises:
in response to the moment when the controlled object is being controlled being within a specific time period, switching the controlled object from the current operating state to a specific operating state, an application parameter corresponding to the specific operating state being worse than an application parameter corresponding to the current operating state.

15. The control device according to claim 11, where in response to the operating information of the target application being the time duration during which the controlled object is under control, switching the target application from a first operating state to a second operating state based on the correspondence between the operating information of the target application and an operating state comprises:
in response to the controlled object being controlled for longer than a specific time duration, switching the controlled object from the current operating state to a specific operating state, an application parameter corresponding to the specific operating state being worse than an application parameter corresponding to the current operating state.

16. The control device according to claim 9, wherein:
in response to the target application being a game application, obtaining the information of the external environment and operating information of the target application comprises:
obtaining the information of the external environment corresponding to a player of the game application and the operating information of the game application; and
switching the controlled object from a first operating state to a second operating state based on the correspondence among the information of the external environment information, the operating information of the target application and the operating state comprises:
controlling a game character in the game application to be from a first operating state to a second operating state based on the correspondence among information of the external environment corresponding to the player, the operating information of the game application and the operating state, an ability value of the controlled object in response to the game character being in the first operating state being different from an ability value of the controlled object in response to the game character being in the second operating state.

17. A non-transitory computer-readable storage medium for storing programs, when executed, causing one or more processors to perform a control method, comprising:

obtain information of an external environment and operating information of a target application, the target application being an application configured to respond to information of an external operation to cause an object controlled by the target application to generate a corresponding response, the information of the external environment being different from the information of the external operation, is collected by a terminal corresponding to the target application via a sensor, the external environment information being at least related to one of: a natural environment, including temperature, intensity of light, time of the day, and location where the terminal corresponding to the target application is located, and a current state of a user corresponding to the target application, wherein the current state of the user includes an operating duration, an interacting moment, and an interacting duration; and switch the controlled object from a first operating state to a second operating state based on a correspondence among the external environment information, the operating information of the target application and an operating state, the correspondence indicating the operating state of the object under different information of the external environment information and different operating information of the target application, and an application parameter of the target application corresponding to the controlled object being in the first operating state being different from an application parameter of the target application corresponding to the controlled object being in the second operating state.

* * * * *